(12) United States Patent
Sasaki et al.

(10) Patent No.: US 9,500,162 B2
(45) Date of Patent: Nov. 22, 2016

(54) VALVE APPARATUS

(71) Applicant: DENSO CORPORATION, Kariya, Aichi-pref. (JP)

(72) Inventors: Kazushi Sasaki, Obu (JP); Ryo Sano, Kariya (JP); Satoshi Ishigaki, Takahama (JP); Hiroki Shimada, Anjo (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 13/948,689

(22) Filed: Jul. 23, 2013

(65) Prior Publication Data

US 2014/0034029 A1    Feb. 6, 2014

(30) Foreign Application Priority Data

Aug. 2, 2012 (JP) ................. 2012-171894
Nov. 14, 2012 (JP) ................. 2012-250694

(51) Int. Cl.
*F02M 25/07* (2006.01)
*F16K 31/04* (2006.01)
*F16K 37/00* (2006.01)
*F16K 31/524* (2006.01)

(52) U.S. Cl.
CPC ......... *F02M 25/0773* (2013.01); *F02M 26/54* (2016.02); *F16K 31/042* (2013.01); *F16K 31/047* (2013.01); *F16K 31/52408* (2013.01); *F16K 37/0083* (2013.01)

(58) Field of Classification Search
CPC ............ F02M 25/0773; F02M 25/0756; F02M 25/0794; F02M 25/079; F02M 25/0777; F02M 25/0793; F02M 25/0788; F02D 41/0077; F16K 31/042; F16K 31/043; F16K 37/0083
USPC ....... 123/568.21–568.26, 90.1, 90.16, 90.17, 123/90.23
See application file for complete search history.

(56) References Cited

U.S. PATENT DOCUMENTS

| 5,553,595 | A | | 9/1996 | Nishioka et al. |
| 5,555,776 | A | * | 9/1996 | Gazza ................. F16H 53/00 250/231.13 |
| 6,382,195 | B1 | * | 5/2002 | Green ................. F02M 26/48 123/568.23 |
| 6,722,351 | B2 | * | 4/2004 | Vamvakitis ........... F02D 9/12 123/568.18 |

(Continued)

FOREIGN PATENT DOCUMENTS

JP    2014-001782    1/2014
WO   WO 99/63256    12/1999

OTHER PUBLICATIONS

Office Action (3 pages) dated Jul. 1, 2014, issued in corresponding Japanese Application No. 2012-250694 and English translation (3pages).

*Primary Examiner* — Stephen K Cronin
*Assistant Examiner* — Long T Tran
(74) *Attorney, Agent, or Firm* — Nixon & Vanderhye P.C.

(57) ABSTRACT

A valve apparatus performs at least one of a first operation in which an electric motor is energized in a valve-close direction and a rotation shaft is rotated until its rotation is stopped and a second operation in which the electric motor is deenergized and a valve is fully closed by a biasing force of a return spring. Thereby, a rotation angle of the rotation shaft becomes a rotation-stop angle or the rotation angle becomes in the backlash range, so that a biasing force of the return spring is not transmitted to the rotation shaft. Then, the electric motor generates a specified torque, which is less than a valve-opening torque by which the valve starts opening. Thereby, a rotation angle of the rotation shaft can be stopped at a full-close angle. The full-close angle can be made correspond to an output of a rotational angle sensor.

9 Claims, 5 Drawing Sheets

(56) References Cited

U.S. PATENT DOCUMENTS

| | | | | | |
|---|---|---|---|---|---|
| 7,314,041 | B2* | 1/2008 | Ogawa | ................... | F02M 26/01 |
| | | | | | 123/568.14 |
| 7,950,623 | B2* | 5/2011 | Sasaki | ................ | F02D 41/0077 |
| | | | | | 251/129.04 |
| 2005/0258823 | A1* | 11/2005 | Kinoshita | ................ | F01L 1/34 |
| | | | | | 324/207.23 |
| 2008/0276915 | A1* | 11/2008 | Tanabe | ................... | F01L 1/022 |
| | | | | | 123/568.21 |
| 2009/0160275 | A1* | 6/2009 | Keefover | ................ | F16H 25/14 |
| | | | | | 310/83 |
| 2009/0229583 | A1* | 9/2009 | Kotooka | ................ | F02D 21/08 |
| | | | | | 123/568.18 |
| 2010/0089370 | A1* | 4/2010 | Furukawa | ............. | F02M 26/26 |
| | | | | | 123/568.12 |

\* cited by examiner

VALVE APPARATUS

CROSS-REFERENCE TO RELATED APPLICATION

This application is based on Japanese Patent Applications No. 2012-171894 filed on Aug. 2, 2012, and No. 2012-250694 filed on Nov. 14, 2012, the disclosures of which are incorporated herein by reference.

TECHNICAL FIELD

The present disclosure relates to a valve apparatus which drives a valve in such a manner that a rotational movement of the valve is converted into a linear movement of the valve. Especially, the valve apparatus has a configuration in which a return spring biases a slide shaft in a valve-close direction.

BACKGROUND

JP-2009-516134A (WO-2007-059100A1) shows a valve apparatus which drives a valve in such a manner that a rotational movement of an output shaft of an electric actuator is converted into an axial movement of a slide shaft. In this valve apparatus, a link mechanism is employed to convert the rotational movement into the axial movement. A cam groove is formed on a cam plate rotating with a rotation shaft. When the cam plate and the cam groove are rotated, a cam follower engaging with the cam groove is driven, whereby a slide shaft is moved in its axial direction.

The rotation shaft is biased in a valve-close direction by a biasing force of a return spring. When the electric actuator becomes faulty, the valve is closed by the biasing force of the return spring. When the valve is opened, that is, when the valve body does not sit on a valve seat, the cam follower and slide shaft may vibrate due to an axial clearance gap between the cam groove and the cam follower.

It is conceivable that the return spring biases the slide shaft in a valve-close direction so that the cam follower and the slide shaft do not vibrate by the biasing force of the return spring even though the valve is opened. (This configuration is not prior art)

When the slide shaft is biased by the return spring in a valve-close direction and the valve body fully sits on the valve seat, the valve seat receives the biasing force of the return spring. Thus, when the valve is fully closed, the biasing force of the return spring is not transmitted to the rotation shaft.

The above operation will be specifically described, hereinafter.

A rotation angle range of the rotation shaft includes a backlash range (refer to "α" in FIG. 3) from a rotation-stop angle to a full-close angle. At the rotation-stop angle, the rotation shaft mechanically stops a rotation in valve-close direction (refer to θ0 in FIG. 3). The full-close angle is an angle of immediately before the valve starts opening (refer to θa in FIG. 3).

The rotation-stop angle and the full-close angle are not coincided with each other. In the backlash range, since the valve seat receives the biasing force of the return spring through the valve body, the rotation shaft does not receive the biasing force of the return spring.

In a case that a learning processing is performed with respect to the full-close angle and an output of a rotational angle sensor detecting the rotation angle of the rotation shaft, a first operation or a second operation is performed. In the first operation, the electric motor is energized in the valve-close direction and the rotation shaft is rotated until its rotation is stopped. In the second operation, the electric motor is deenergized and the valve is fully closed by the biasing force of the return spring only.

However, in a case of the first operation, the angle of the angle of the rotation shaft corresponds to the rotation-stop angle. Since the rotation-stop angle is different from the full-close angle, the learning processing can not be performed, in which the full-close angle and the output of a rotational angle sensor are made to correspond.

Figure 3:
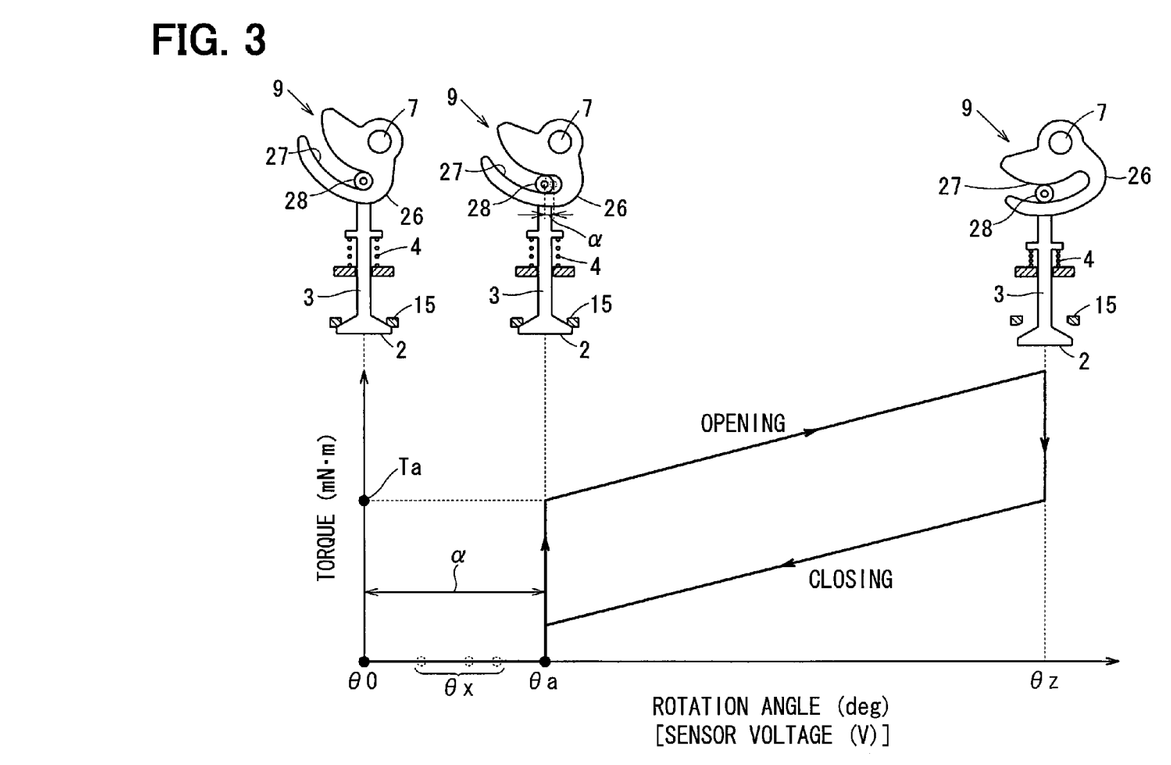
FIG. 3 is a chart showing a relationship between a driving torque applied to a slide shaft and a rotation angle (sensor voltage of a rotational angle sensor) of a rotation shaft and a cam plate, according to the first embodiment.

In a case of the second operation, the angle of the rotation shaft corresponds to an angle in the backlash range (refer to θx in FIG. 3). Since this angle in the backlash range is different from the full-close angle, the above learning processing can not be performed.

SUMMARY

It is an object of the present disclosure to provide a valve apparatus in which a full-close angle and an output of a rotational angle sensor correspond to each other. The valve apparatus drives a valve in such a manner that a rotational movement of the valve is converted into a linear movement of the valve. The valve apparatus has a configuration in which a return spring biases a slide shaft in a valve-close direction.

A learning portion performs at least one of a first operation and a second operation. In the first operation, an electric motor is energized in a valve-close direction and a rotation shaft is rotated until its rotation is stopped. In the second operation, the electric motor is deenergized and the valve is fully closed by a biasing force of the return spring only. Thereby, a rotation angle of the rotation shaft becomes a rotation-stop angle or in a backlash range.

Then, the electric motor is energized to rotate in the valve-open direction, whereby a specified torque, which is less than a valve-opening torque by which the valve starts opening, is applied to the slide shaft. When the rotation angle is at the rotation-stop angle and when the rotation angle is in the backlash range, the biasing force of the return spring is not transmitted to the rotation shaft. Thereby, the valve can be held at a fully-closed position and the angle of the rotation shaft can be stopped at the full-close angle.

At this moment, an output of a rotational angle sensor is made correspond to the full-close angle. As a result, the accuracy of the EGR control can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

[First Embodiment]

Figure 1:
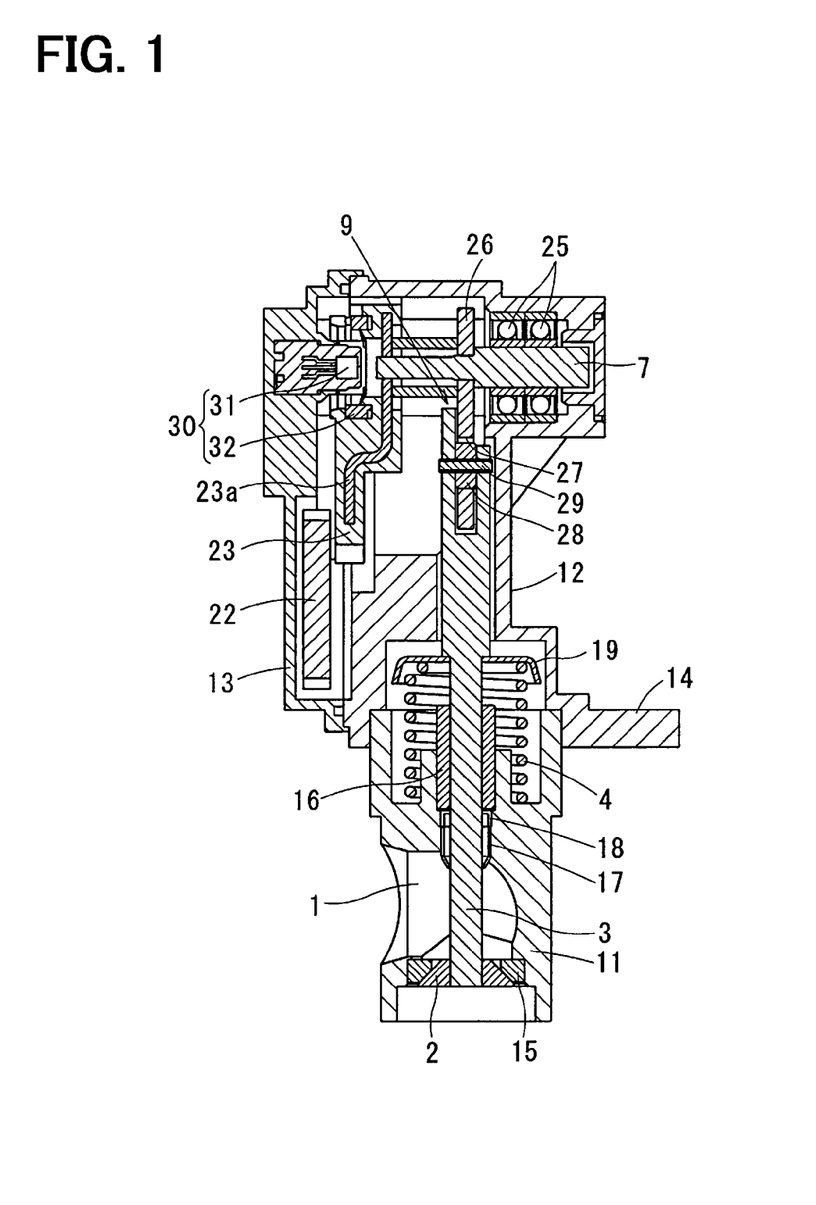
FIG. 1 is a cross-sectional view of an EGR valve according to a first embodiment.
Figure 2:
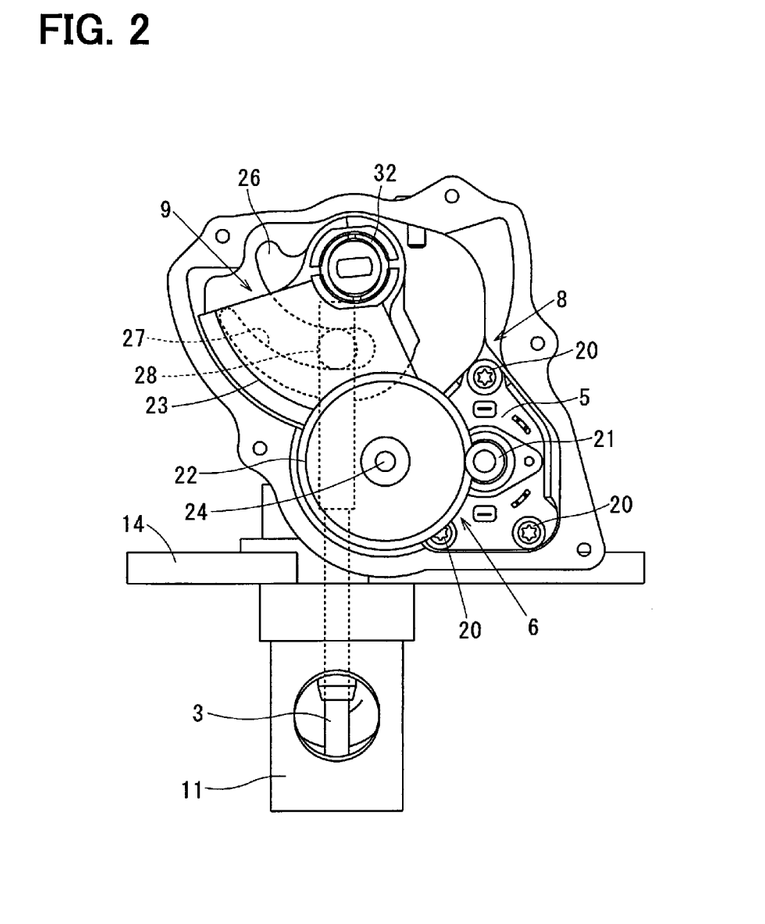
FIG. 2 is an external view of the EGR valve, which shows an interior of an electric actuator without cam plate according to the first embodiment.

Referring to FIGS. 1 to 3, a first embodiment will be described hereinafter. In the following description, an upper side of FIG. 1 is referred to as upper and a lower side of FIG. 1 referred to as lower. However, this upper-lower direction does not correspond to a mounting direction to a vehicle. In the present embodiment, the valve apparatus is applied to an EGR valve of an exhaust gas recirculation system (EGR system).

The EGR system is a well known system in which a part of exhaust gas is returned to an intake pipe as an EGR gas. The EGR system has an EGR passage 1 through which a part of exhaust gas flows and an EGR valve which performs an opening-closing and an opening adjustment of the EGR passage 1.

The EGR valve may be provided in a high-negative-pressure area in the intake passage or in a low-negative-pressure area in the intake passage.

A specific configuration of the first embodiment will be described hereinafter.

The EGR valve is provided with: a housing defining a part of the EGR passage 1; a valve 2 driven in an axial direction (up-down direction) for performing an opening-closing and an opening adjustment of the EGR passage 1 in the housing; a slide shaft 3 driving the valve 2 in its axial direction; a return spring 4 biasing the slide shaft 3 in a valve-close direction (upward); an electric actuator 8 transmitting a rotation of an electric motor 5 to a rotation shaft 7 through a reduction gear 6; a link mechanism 9 (rotation-linear conversion portion) converting a rotational movement of the rotation shaft 7 into a linear movement of the slide shaft 3 in its axial direction, and a rotational angle sensor 30 for detecting a rotation angle of the rotation shaft 7.

The housing is comprised of a lower-housing 11 which defines a part of the EGR passage 1 and an upper-housing 12 fixed on an upper part of the lower-housing 11. The upper-housing 12 is provided with a sensor cover 13. The upper-housing 12 has a flange 14 for fixing the valve to a vehicle.

The lower-housing 11 and the upper-housing 12 are made of aluminum. As mentioned above, a part of EGR passage 1 is defined in the lower-housing 11. A ring-shaped valve seat 15 is provided in the EGR passage 1. The valve seat 15 is made of material having high heat resistance and high corrosion resistance, such as stainless steel.

The valve 2 is a poppet valve fixed to a lower end of a slide shaft 3 by welding. The valve 2 opens and closes the EGR passage 1 according to an axial position of the slide shaft 3. Further, the valve 3 can vary an opening area of the EGR passage 1 according to an axial position of the slide shaft 3. An EGR gas amount which is returned to the intake passage depends on the opening area of the EGR passage 1.

Specifically, when the valve 2 sits on the valve seat 15, the EGR valve is closed. When the valve 2 moves downward from the valve seat 15, the EGR valve is opened. The more the valve 2 moves downward from the valve seat 15, the more the EGR gas amount returned to the intake pipe is increased.

The slide shaft 3 is a column rod which is movable in its axial direction. Specifically, a metal bearing 16 is press-inserted in the lower-housing 11 and the slide shaft 3 is slidably supported by the metal bearing 16 in its axial direction. The slide shaft 3 slides up and down along with the valve 2. A pipe 17 and an oil seal 18 are provided between the lower-housing 11 and the slide shaft 3, so that deposits and the EGR gas do not flow up from the EGR passage 1.

The return spring 4 is a compression spring arranged around the slide shaft 3 in such a manner as to apply its resilient force to the slide shaft 3 through the spring seat 19. Specifically, the return spring 4 is accommodated in a spring chamber which is defined between the upper-housing 12 and the lower-housing 11. The return spring 4 is compressed between the lower-housing 11 and the spring seat 19. The spring seat 19 is in contact with a step portion formed on the slide shaft 3. The resilient force of the return spring 4 (upward spring force) is transmitted to the slide shaft 3 through the step portion.

The electric actuator 8 is a driving power source for driving the valve 2. The electric actuator 8 is comprised of an electric motor 5 generating a rotation torque and a reduction gear 6 increasing the rotation torque of the electric motor 5 to drive the rotation shaft 7.

The electric motor 5 is a well-known direct-current motor. After the electric motor 5 is accommodated in a motor chamber defined in the upper-housing 12, the electric motor 5 is fixed to the upper-housing 12 by a screw 20.

The reduction gear 6 is accommodated in a space defined between the upper-housing 12 and the sensor cover 13. The reduction gear 6 is comprised of a pinion gear (motor gear) 21 rotated by the electric motor 5, an intermediate gear 22 rotated by the pinion gear 21, and an output gear 23 rotated by the intermediate gear 22. The output gear 23 is rotated along with the rotation shaft 7.

The pinion gear 21 is an external gear connected to an output shaft of the electric motor 5. The intermediate gear 22 is comprised of a large diameter gear (shown in FIG. 2) and a small diameter gear which are connected to a supporting shaft 24 supported by the upper-housing 12 and the sensor cover 13. The large diameter gear is always engaged with the pinion gear 21. The small diameter gear is always engaged with the output gear 23.

The output gear 23 is a large external gear into which a joint plate 23a is inserted. The joint plate 23a is connected to one end portion of the rotation shaft 7. The output gear 23 has external gear teeth at only gear-engaging area where the small diameter gear of the intermediate gear 22 can engage with the external gear teeth.

The output gear 23 transfers the rotation torque to the rotation shaft 7. The rotation torque is increased by reducing the rotation speed by the pinion gear 21, the large diameter gear of the intermediate gear 22, the small diameter gear of the intermediate gear 22 and the output gear 23 in this series.

The rotation shaft 7 is rotatably supported by a bearing 25 which is provided in the upper-housing 12. An axial direction of the rotation shaft 7 is established perpendicularly (horizontal) to an axial direction (vertical direction) of the slide shaft 3.

The link mechanism 9 converts the rotational movement of the rotation shaft 7 into the axial linear motion of the slide shaft 3, so that the valve 2 and the slide shaft 3 are driven. The link mechanism 9 is provided with a cam plate 26 rotating with the rotation shaft 7 and a cam follower 28 provided to the slide shaft 3 in such a manner as to engage with a cam groove 27 of the cam plate 26, The cam plate 26 is a plate-shaped cam made from material having high heatproof and high antiwear quality. The cam plate 26 is orthogonally fixed to the rotation shaft 7 rotating along with the output gear 23.

The cam follower 28 is a rolling element having a cylindrical outer surface. The cam follower 28 rotates on a pin 29 which is connected to the slide shaft 3. The pin 29 is a roller rod form arranged in a rectangular direction to the slide direction of the slide shaft 3.

The cam plate 26 has the cam groove 27 to move the cam follower 28 in the axial direction of the slide shaft 3 according to a rotating position of the cam plate 26. Since the cam groove 27 is for moving the slide shaft 3 in its axial direction, a distance between a rotation center of the cam plate 26 and the cam groove 27 varies according to a rotating position of the cam plate 26.

Specifically, the cam groove 27 is arc-shaped as follows:

That is, at the rotation-stop angle θ0, the distance between the rotation center of the cam plate 26 and the cam groove 27 is shortest. At a full-open angle θz where the valve 2 is most apart from the valve seat 15, the distance between the rotation center of the cam plate 26 and the cam groove 27 is longest.

The rotational angle sensor 30 is a position sensor which detects an opening position of the valve 2 based on the rotation angle of the rotation shaft 7. The output signal (output voltage) corresponding to the opening position of the valve 2 is transmitted to an engine control unit (ECU).

Specifically, the rotational angle sensor 30 is a magnetometric sensor which detects a relative rotation between two members while keeping a non-contact. The rotational angle sensor 30 has a magnetic-circuit unit 31 which is inserted into the output gear 23 and is rotated along with the rotation shaft 7. Further, the rotational angle sensor 30 has a magnetic detecting element 32 which are attached to the sensor cover 13 and is in non-contact with the magnetic-circuit unit 31. The output signal of the magnetic detecting element 32 is transmitted to the ECU.

The ECU is a well-known electronic control unit having a microcomputer. The ECU controls the electric motor 5 so that the rotation angle (actual opening of the valve 2) of the rotation shaft 7 detected by the rotational angle sensor 30 agrees with a target rotation angle (target opening of the valve 2) computed according to an engine driving condition, such as engine speed and an accelerator position.

According to the present embodiment, the full-close angle 8a and the output signal of the rotational angle sensor 30 are made correspond to each other by a learning portion (control program). An execution portion performing a learning may be provided in the EGR valve. Alternatively, the execution portion may be provided in an initialization unit, which performs initialization before shipment. Alternatively, the execution portion may be provided in the ECU.

The learning values obtained by the above learning are stored in a memory.

When a start indication of the initialization is provided to the learning portion (when performing initialization before shipment), or when an execution condition of the initialization is established, the learning portion executes following operations (a) and (b).

(a) First, the electric motor 5 is energized to rotate in the valve-close direction. Specifically, a duty signal is applied to the electric motor 5, so that at least one of the first operation and the second operation is performed. As described above, in the first operation, the electric motor 5 is energized in the valve-close direction and the rotation shaft 7 is rotated until its rotation is stopped. In the second operation, the electric motor 5 is deenergized and the valve 2 is fully closed by the biasing force of the return spring 4 only.

In a case that the first operation is performed, the angle of the rotation shaft 7 corresponds to the rotation-stop angle θ0. In a case that the second operation is performed, the angle of the rotation shaft 7 corresponds to an angle in the backlash range "α" (refer to θx in FIG. 3).

(b) Then, the electric motor 5 is energized to rotate in the valve-open direction. Specifically, a duty signal (A % of duty value) of an energization amount "A" is applied to the electric motor 5 so that a torque is generated to the valve 2 in the valve-open direction. The generated torque is less than a valve-opening torque Ta by which the valve 2 starts opening. The generated torque is applied to the slide shaft 3. The rotation-stop angle θ0 and the backlash range "α" correspond to a valve-full-close condition in which the valve 2 sits on the valve seat 15 and the valve seat 15 receives the biasing force of the return spring 4. Thus, when the rotation angle is at the rotation-stop angle θ0 and when the rotation angle is in the backlash range "α", the biasing force of the return spring 4 is not transmitted to the rotation shaft 7.

Thereby, the valve 2 can be held at a fully-closed position and the angle of the rotation shaft 7 can be stopped at the full-close angle θa.

At this moment, the output of the rotational angle sensor 30 is made correspond to the full-close angle θa, whereby the learning of correspondence is completed. As a result, the accuracy of the EGR control can be improved.

[Second Embodiment]

Figure 4A:
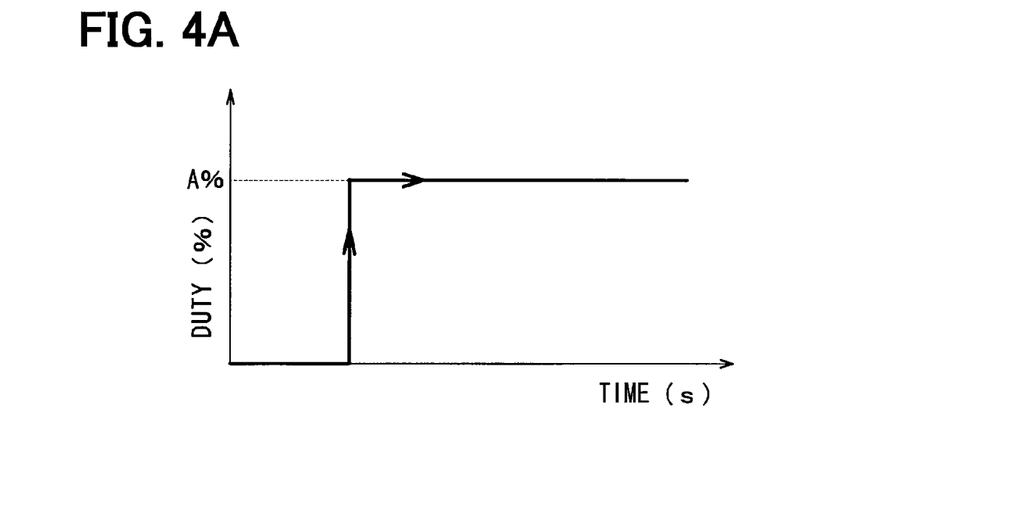
FIG. 4A is a graph for explaining an energization amount applied to an electric motor at a time of learning.
Figure 4B:
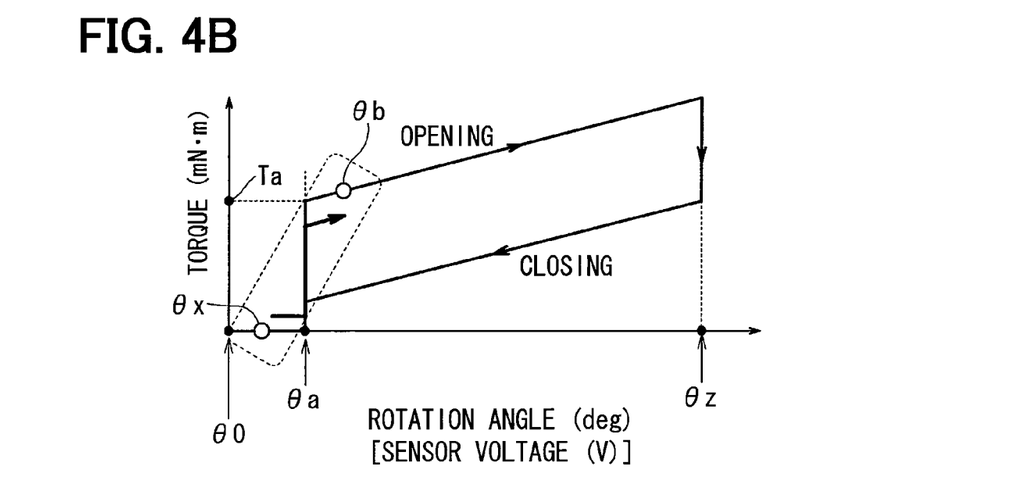
FIG. 4B is a graph for explaining a relationship between a rotation angle (sensor voltage of a rotational angle sensor) of a cam plate and a driving torque applied to a slide shaft.
Figure 5A:
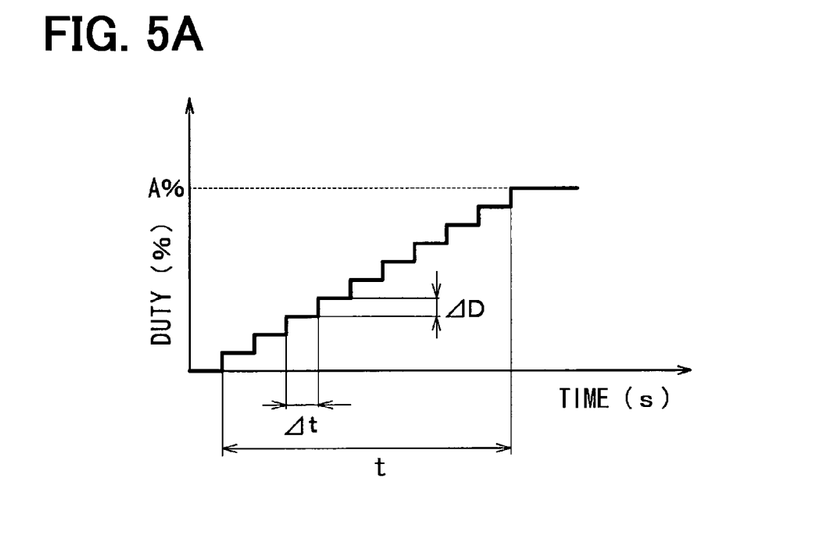
FIG. 5A is a graph for explaining an energization amount applied to an electric motor at a time of learning, according to a second embodiment.
Figure 5B:
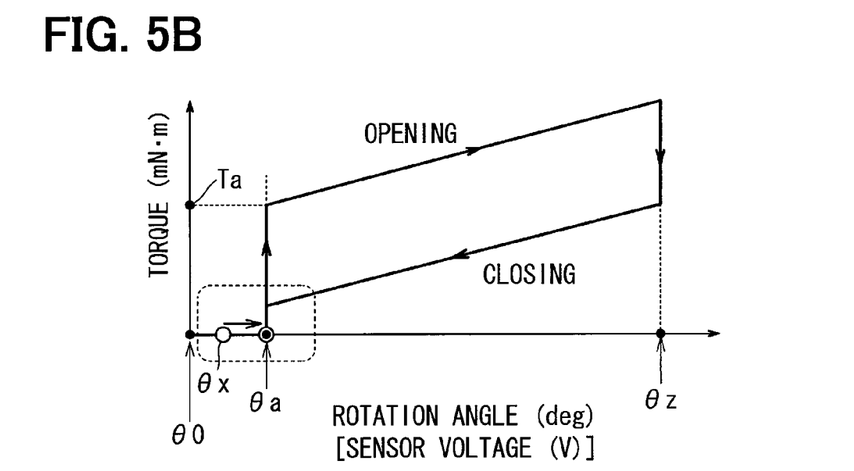
FIG. 5B is a graph for explaining a relationship between a rotation angle (sensor voltage of a rotational angle sensor) of a cam plate and a driving torque applied to a slide shaft, according to the second embodiment.

Referring to FIGS. 4A, 4B and 5, a second embodiment will be described hereinafter. In the second embodiment, the same parts and components as those in the first embodiments are indicated with the same reference numerals.

First, referring to FIGS. 4A and 4B, a background of the second embodiment will be described. As described in the first embodiment, when the learning of the correspondence between the full-close angle θa and the output of the rotational angle sensor 30 is performed, the duty signal (A % of duty value) is applied to the electric motor 5 and the specified torque, which is less than the torque Ta, is applied to the slide shaft 3.

After performing the first operation or the second operation, as shown in FIG. 4A, when the energization amount "A" is applied to the electric motor 5 at once, that is, when the duty signal of "A"% is applied to the electric motor 5 at once, each moving element (the reduction gear 6, the rotation shaft 7, the cam plate 26) receives a large acceleration force at the full-close angle θa. Due to the large acceleration force, the rotation shaft 7 does not stop at the full-close angle θa. As shown in FIG. 4B, the rotation shaft 7 rotates to an angle θb, so that the valve 2 may be opened.

According to the second embodiment, after performing the first operation or the second operation, the energization amount "A" is applied to the electric motor 5 continuously or stepwise. That is, the duty ratio applied to electric motor 5 is continuously or stepwisely increased to the duty ratio "A"%.

FIG. 5A shows the above control specifically.

After performing the first operation or the second operation, the duty ratio applied to electric motor 5 is continuously increased to the duty ratio "A"% in a specified time period "t". In FIG. 5A, "Δt" represents a duty calculation cycle (calculation period of ECU) and "ΔD" represents an increased ratio during "Δt".

Thus, the acceleration force applied to each moving element (the reduction gear 6, the rotation shaft 7, the cam plate 26 and the like) driven by the electric motor 5 can be made smaller. That is, the acceleration force at the full-close angle θa can be made smaller.

For this reason, when the energization amount "A" is applied to the electric motor 5, it can be avoided that the valve 2 is opened. Thereby, the learning of the correspondence between the full-close angle θa and the output of the rotational angle sensor 30 can be performed in a condition where the rotation shaft 7 is stopped certainly at the full-close angle θa. The reliability of learning can be improved, and the reliability of the EGR control can be improved as a result.

Although the duty ratio is increased to "A"% by a constant rate in the second embodiment, the duty ratio may be increased on a curved line. Alternatively, the duty ratio may be increased stepwise. For example, the duty ratio may be increased by two steps, three steps or four steps.

In the above embodiments, instead of the link mechanism 9, a rack & pinion mechanism can be used.

Although the sequence-type gear reducer (sequentially geared type) is used as the reduction gear 6, a planetary gear reduction or a trochoid gear reduction may be used. Alternatively, instead of using the reduction gear 6, the electric motor 5 of high torque may directly drive the rotation shaft 7.

Although the valve apparatus is applied to an EGR valve in the above embodiments, the valve apparatus can be applied to other valve, such as a valve for a secondary air supply system.

What is claimed is:

1. A valve apparatus comprising:
    a slide shaft which slides in its axial direction to open and close a valve;
    a return spring biasing the slide shaft in a valve-close direction;
    an electric actuator having an electric motor which rotates a rotation shaft;
    a rotation-linear conversion portion converting a rotational movement of the rotation shaft into a linear movement of the slide shaft in its axial direction;
    an electronic control unit having a computer;
    a rotational angle sensor detecting a rotation angle of the rotation shaft; and
    a learning portion making a correspondence between a full-close angle of the rotation shaft at a full closed position of the valve and an output signal of the rotational angle sensor, wherein:
    the electric motor is a direct-current motor which generates a rotation torque according to an energization amount,
    the electronic control unit, upon execution of the learning portion by the computer of the electronic control unit, controls the electric motor to perform at least one of a first operation in which the electric motor is energized in a valve-close direction and the rotation shaft is rotated until its rotation is stopped, and a second operation in which the electric motor is deenergized and the valve is fully closed by a biasing force of the return spring only, whereby the rotation angle of the rotation shaft is brought into a rotation-stop angle which is advanced in an anti-valve-close direction or a backlash range, and
    the electric motor is energized to rotate in the valve-open direction, whereby a specified torque, which is less than a valve-opening torque by which the valve starts opening, is applied from the rotation shaft to the slide shaft, so that the rotation angle of the rotation shaft is compulsorily brought into the rotation-stop angle and the output signal of the rotational angle sensor is made so as to correspond to the full-close angle.

2. A valve apparatus according to claim 1, wherein:
    when the electronic control unit, upon execution of the learning portion by the computer of the electronic control unit, makes the output signal of the rotational angle sensor correspond to the full-close angle, an energization amount to the electric motor is continuously or stepwisely increased to a specified amount.

3. A valve apparatus according to claim 1, wherein:
    the rotation-linear conversion portion is a link mechanism provided with a cam plate rotating with the rotation shaft and a cam follower provided to the slide shaft in such a manner as to engage with a cam groove of the cam plate.

4. A valve apparatus according to claim 1, wherein:
    the electronic actuator has the electric motor and a reduction mechanism increasing a rotation torque of the electric motor to drive the rotation shaft.

5. A valve apparatus according to claim 1, wherein:
    the return spring is a compression spring arranged around the slide shaft in such a manner as to apply its resilient force to the slide shaft through a spring seat.

6. A valve apparatus according to claim 1, wherein:
    the valve apparatus is an EGR valve which opens and closes an EGR passage through which a part of exhaust gas emitted from an engine is returned to an intake passage of the engine.

7. A valve apparatus according to claim 1, wherein the full-close angle of the rotation shaft is the most close to an angle at which the valve is opened.

8. A valve apparatus according to claim 1, wherein a specified torque, which is less than a valve-opening torque by which the valve starts opening, is applied to the slide shaft.

9. A valve apparatus according to claim 1, wherein while the rotation shaft is rotated, a torque is applied to the rotation shaft in such a manner that the slide shaft does not slide.

* * * * *